(12) United States Patent
Lee et al.

(10) Patent No.: US 7,723,922 B2
(45) Date of Patent: May 25, 2010

(54) LIGHT EMITTING DIODE DRIVING DEVICE

(75) Inventors: Sang Yun Lee, Gyunggi-Do (KR); Chang Hoon Baek, Gyunggi-Do (KR); Do Hun Kim, Seoul (KR); Hyung Suk Kim, Gyunggi-Do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/142,375

(22) Filed: Jun. 19, 2008

(65) Prior Publication Data

US 2008/0315780 A1    Dec. 25, 2008

(30) Foreign Application Priority Data

Jun. 20, 2007    (KR)    ........................ 10-2007-0060347

(51) Int. Cl.
*H05B 37/02*    (2006.01)

(52) U.S. Cl. .................. 315/210; 315/291; 315/307; 315/320

(58) Field of Classification Search ............. 315/209 R, 315/224, 291, 307, 308, 210, 211, 217, 225, 315/287, 312, 320, 360; 363/15, 19, 74
See application file for complete search history.

(56) References Cited

U.S. PATENT DOCUMENTS

| | | | |
|---|---|---|---|
| 5,017,837 A | | 5/1991 | Hanna et al. |
| 6,362,578 B1 * | 3/2002 | Swanson et al. | 315/307 |
| 6,621,235 B2 * | 9/2003 | Chang | 315/216 |
| 6,864,641 B2 * | 3/2005 | Dygert | 315/216 |
| 7,081,722 B1 * | 7/2006 | Huynh et al. | 315/323 |
| 7,402,960 B2 * | 7/2008 | Kajita | 315/291 |

FOREIGN PATENT DOCUMENTS

KR    10-2007-0049735 A    5/2007

OTHER PUBLICATIONS

Korean Intellectual Property Office, Office Action, Feb. 26, 2008.

* cited by examiner

*Primary Examiner*—Douglas W Owens
*Assistant Examiner*—Jimmy T Vu
(74) *Attorney, Agent, or Firm*—Lowe Hauptman Ham & Berner, LLP

(57) ABSTRACT

There is provided an integrated LED driving device including: a DC/DC converting part converting and outputting a DC voltage inputted from the outside by switching of a switch into a driving voltage of a magnitude suitable for driving a plurality of LED arrays; a constant current controlling part receiving at least one of information on the current flowing through the LED array and information on a voltage applied to the LED array by feed-back, the constant current controlling part including a PWM controller PWM-controlling a switching duty of the switch of the DC/DC converting part, and controlling a switching duty of each of the switches of the switching part to allow the current to flow through the LED array with a predetermined magnitude; and a control logic receiving a control signal by a user and controlling the PWM controller in response to the control signal.

6 Claims, 1 Drawing Sheet

LIGHT EMITTING DIODE DRIVING DEVICE

CROSS-REFERENCE TO RELATED APPLICATIONS

This application claims the priority of Korean Patent Application No. 2007-60347 filed on Jun. 20, 2007, in the Korean Intellectual Property Office, the disclosure of which is incorporated herein by reference.

BACKGROUND OF THE INVENTION

1. Field of the Invention

The present invention relates to a light emitting diode (LED) driving device, more particularly, in which various circuits required for driving LEDs such as a direct current (DC)/direct current (DC) conversion circuit and a pulse width modulation (PWM) control circuit are integrated into one chip.

2. Description of the Related Art

In general, a cold cathode fluorescent lamp (CCFL) used as a light source of a conventional liquid crystal display (LCD) employs mercury gas, which may trigger environmental pollution. Besides, the CCFL is slow in response rate, low in color reproducibility and inappropriate for a smaller-sized and lighter-weight liquid crystal display (LCD) panel.

In contrast, a light emitting diode (LED) is environment-friendly, high in response rate with several nano seconds, thus effective for a video signal stream and capable of being impulsively driven. Moreover, the LED can reproduce color by 100% and alter brightness and color temperature by adjusting light amount of red, green and blue LEDs. Also, the LED carries advantages suitable for the smaller-sized and lighter-weight LCD panel. Therefore, of late, the LED has been actively employed as a backlight source of the LCD panel.

As described above, in a case where an LED array having a plurality of LEDs connected to one another is utilized in the liquid crystal display (LCD) backlight employing the LED, a driving circuit for driving the LED array requires a direct current-direct current (DC-DC) converter converting an input voltage inputted from the outside into a voltage suitable for driving the LED array, and a driving circuit supplying a predetermined constant current to the LED array. Moreover, the LED array driving circuit additionally requires a dimming circuit which enables a user to adjust brightness and color temperature arbitrarily or adjust brightness of the LEDs for e.g., temperature compensation.

Conventionally, various circuits for driving the LEDs are individually implemented using lumped devices such as a resistor or a capacitor or partially integrated into a chip, as demonstrated by e.g., a direct current (DC)-direct current (DC) converter.

Therefore, these conventional driving circuits for driving the LED arrays necessitate a board of a wide area for disposing the individual LEDs thereon. The conventional circuits also necessarily require a process for disposing the devices on an individual basis. Particularly, when dimming control is in need to control brightness of the LEDs by an external control signal, the board of a broader area and the devices are required.

Therefore, the conventional LED driving circuits involve higher costs due to a greater number of external devices, higher defect ratio during assembling, and less compactness.

SUMMARY OF THE INVENTION

An aspect of the present invention provides a light emitting diode (LED) driving device in which various circuits for driving LEDs are integrated into one chip.

An aspect of the present invention also provides an LED driving device capable of controlling driving of LEDs by an external wire or wireless control signal.

According to an aspect of the present invention, there is provided a light emitting diode (LED) driving device for driving a plurality of LED arrays each including a plurality of LEDs connected in series to one another, the LED driving device including: a direct current (DC)/direct current (DC) converting part converting and outputting a DC voltage inputted from the outside by switching of a switch into a driving voltage of a magnitude suitable for driving the plurality of LED arrays; a switching part including a plurality of switches each connected to one end of each of the LED arrays to switch on/off a current flowing through the each of the LED arrays; a constant current controlling part receiving at least one of information on the current flowing through the LED array and information on a voltage applied to the LED array by feedback, the constant current controlling part including a pulse width modulation controller pulse width modulation-controlling a switching duty of the switch of the DC/DC converting part and controlling a switching duty of each of the switches of the switching part to allow the current to flow through the LED array with a predetermined magnitude; and a control logic receiving a control signal by a user and controlling the pulse width modulation controlling part in response to the control signal.

The constant current controlling part may further include a protective circuit receiving the at least one of the information on the current flowing through the LED array and the information on the voltage applied to the LED array and controlling the pulse width modulation controlling part to block the voltage or current applied to the LED array, when an overcurrent flows through the LED array or an overvoltage is applied to the LED array.

The LED driving device may further include a wireless communication protocol part receiving the control signal wirelessly, wherein the wireless communication protocol part has wireless communication controlled by a control logic.

The DC/DC converting part may include a multi-channel DC/DC converting part for driving the plurality of LED arrays individually through multiple channels, and the pulse width modulation controlling part pulse width modulation-controls a corresponding one of the LED arrays belonging to each of the channels individually.

The LED driving device may further include a pulse width modulation phase converting part controlling the pulse width modulation controlling part to generate phase difference when pulse width modulation-controlling the LED array of the each channel.

The control logic may control the pulse width modulation controlling part to determine one of enablement and disablement of at least portions of the LED arrays.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
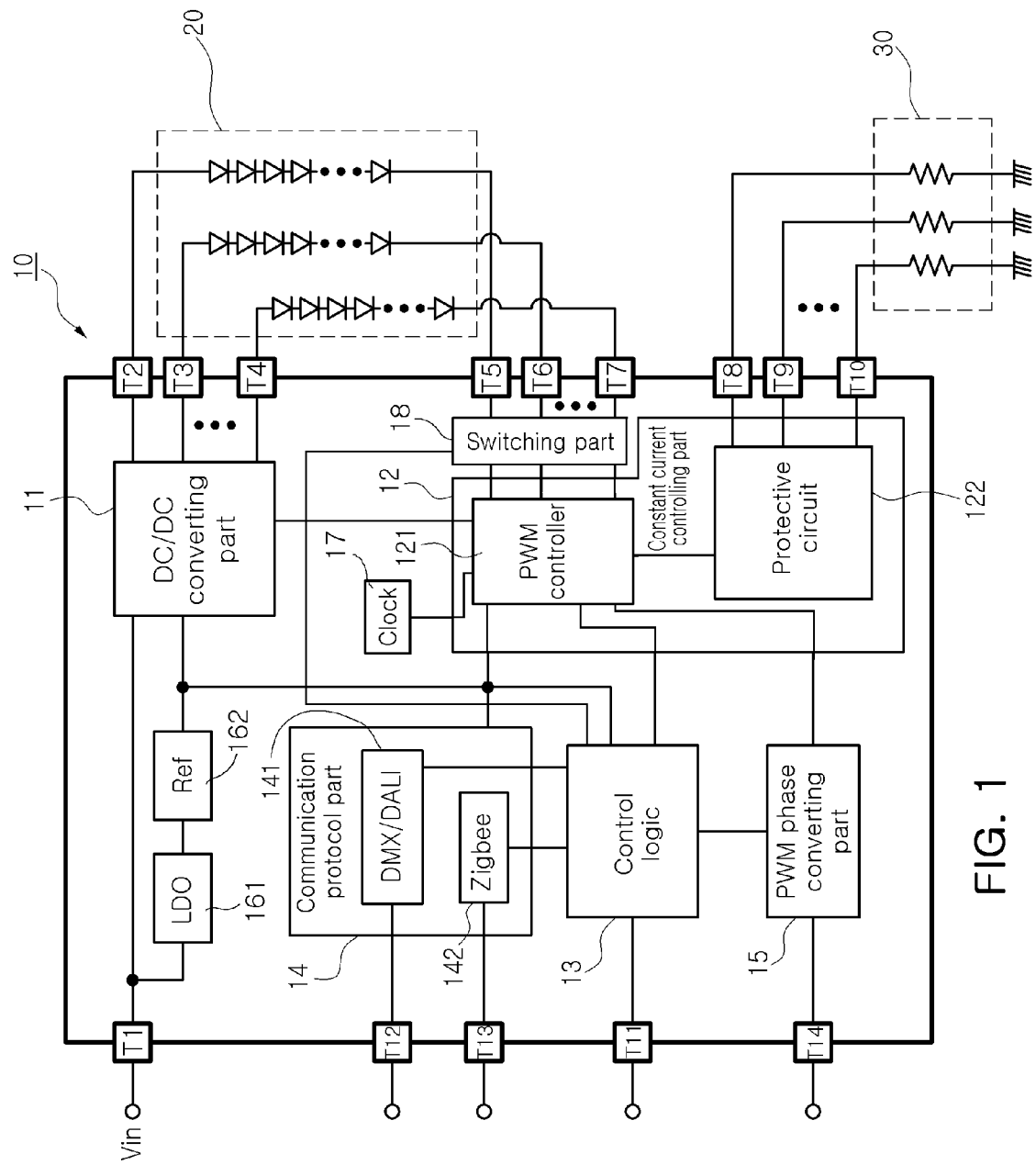
FIG. 1 is a block diagram illustrating a light emitting diode (LED) driving device according to an exemplary embodiment of the invention.

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

FIG. 1 is a block diagram illustrating a light emitting diode (LED) driving device according to an exemplary embodiment of the invention.

Referring to FIG. 1, the LED driving device 10 of the present embodiment includes a plurality of input and output terminals T1 to T14, a direct current (DC)/direct current (DC) converting part 11, a constant current controlling part 12, and a control logic 13. The DC/DC converting part 11 converts a magnitude of an input voltage Vin inputted to the terminal T1 adequately to provide to light emitting diodes (LED)s through the terminals T2 to T4. The constant current controlling part 12 includes a pulse width modulation (PWM) controller 121 receiving a current flowing through each of the LED arrays 20 via the terminals T5 to T7 by feed-back and PWM-controlling the DC/DC converting part 11 to allow the current to be supplied to the each of the LED arrays 20 constantly according to a magnitude of the fed-back current. The control logic 13 receives a control signal of a user through the terminal T11 and controls the PWM controller 121 in response to the control signal.

In addition to the above basic elements, the LED driving device of the present embodiment may further include a wireless communication protocol part 14 receiving the control signal of the user from the outside wirelessly. Here, the wireless communication protocol part 14 can have wireless communication controlled by the control logic 13.

The DC/DC converting part 11 converts the DC voltage Vin inputted by controlling of a switching duty of a switch into a DC voltage of an adequate magnitude for driving the LED arrays 20. The DC/DC converting part 11 may be configured as a DC/DC converter known in the art, such as a buck type, a boost type and a buck boost type.

The DC/DC converting part may adopt a multi-channel type for outputting a plurality of output voltages. That is, the DC/DC controlling part 11 of the multi-channel type can output the plurality of output voltages capable of controlling a magnitude of the DC voltage individually through separate output terminals T2 to T4, respectively. The output terminals T2 to T4 are electrically connected to corresponding ones of the LED arrays to be individually controlled.

The constant current controlling part 12 may be formed of a PWM controller 121 and a protective circuit 122.

The PWM controller 121 receives at least one of information on a current flowing through each of the LED arrays 20 and information on a voltage applied to the LED array 20 by feed-back, and controls a switching duty of the switch of the DC/DC converting part 11 to ensure the current to flow through the LED array 20 constantly. For example, in a case where the DC/DC converting part 11 has a bigger output current with increase in the switching duty and a smaller output current with decrease in the switching duty, the PWM controller 121 can increase the switching duty of the DC/DC converting part 11 when the fed-back information on the current is smaller than a preset reference current. Meanwhile, the PWM controller 121 can decrease the switching duty of the DC/DC converting part 11 when the fed-back information on the current is greater than the preset reference current. Through this constant PWM control, the PWM controller 121 allows the driving current to be outputted from the current/current converting part 11 and supplied to the LED array at a constant level.

Meanwhile, in a case where the DC/DC converting part 11 adopts a multi-channel type capable of driving the plurality of LED arrays individually through multi-channels, the PWM controller 121 can perform PWM control individually for each of the channels, thereby driving the LED array of the each channel individually. When this multi-channel individual PWM control is performed by the DC/DC converting part 11 and the PWM controller 121, the each channel includes red, green and blue LEDs to drive the LEDs of each color simultaneously. Such independent driving of the LEDs of each color enables color control or local dimming.

The protective circuit 122 receives at least one of the information on the current flowing through the each of the LED arrays 20 and the information on the voltage applied to the LED array 20 by feed-back, and controls the PWM controller 121 to block the voltage or current applied to the LED array, when an overcurrent flows through the LED array 20 or an overvoltage is applied to the LED array 20. The protective circuit 122 may directly receive at least one of the current and the voltage from the LED array 20 or receive the at least one of the current and the voltage by feed-back from an additional detection resistor 30 detecting the at least one of the current flowing through the LED array 20 and the voltage applied to the LED array 20.

The protective circuit 122 determines that an overcurrent and/or an overvoltage is applied when the current and/or voltage received by feed-back is greater than a reference current and/or reference voltage. Then, the protective circuit 122 controls the PWM controller 121 to block the voltage or the current applied to the LED array from the DC/DC converting part 11. For example, when the switching duty has a relationship with the output direct voltage as described above, the protective circuit 122 controls the PWM controller 121 to control the switching duty of the DC/DC converting part 11 to be zero when the overcurrent and/or overvoltage is applied.

The control logic 13 receives a control signal by a user through the input terminal T14, and controls the PWM controller 121 in response to the control signal. The control signal of the user may be a dimming control signal for controlling brightness of the LED arrays. The control logic 13 supplies a control signal corresponding to the dimming control signal of the user to the PWM controller 121. The PWM controller 121 controls a switching duty of the DC/DC converting part 11 to allow the current corresponding to the control signal inputted from the control logic 13 to flow through the each of the LED arrays 20 constantly.

The control logic 13 may control not only the PWM controller 121 but also other elements of the LED driving device of the present embodiment.

Meanwhile, according to the present embodiment, the LED driving device may further include a wireless communication protocol part 14 receiving the control signal wirelessly. The wireless communication protocol part 14 can have wireless communication controlled by the control logic 13. The wireless communication protocol part 14 may be a general protocol for lighting such as digital addressable lighting interface (DALI) and Digital Multiplexing (DMX). Alternatively, the wireless communication protocol part 14 may be a short-range wireless communication protocol such as Zigbee which can be applied to a sensor network of a wireless personal area network (WPAN). The control signal is inputted as an appropriate wireless signal to the wireless communication protocol part 14 through the input terminals T12 and T13 in accordance with the afore-said wireless communication protocol. The wireless communication protocol part 14 converts the wireless signal into a control signal to be received by the control logic 13 to supply to the control logic 13. The control logic 13 determines the control signal, and controls the PWM controller 121 to control the LED arrays to be driven by wireless communication.

Moreover, according to the present embodiment, when the DC/DC converting part 11 supplies a driving voltage to a plurality of channels, the LED driving device may further include a PWM phase converting part 15 controlling the PWM controller 121 to generate phase difference in PWM controlling a corresponding one of the LED arrays belonging to each of the channels. In a case where the LED array of the each channel is PWM controlled with an identical phase by the PWM controller 121, the LED driving device highly risks problems such as excessive increase in a peak current and increase in electromagnetic interference (EMI) noises. Therefore, when the user's request is inputted to the input terminal T14 from the outside, the PWM converting part 15 controls the PWM controller 121 to generate phase difference in PWM controlling the LED array of the each channel.

In addition, according to the present embodiment, the LED driving device may further include a switching part 18 enabling or disabling the each channel when the DC/DC converting part 11 supplies the driving voltage to the plurality of channels. Here, the control logic 13 controls the switching part to determine one of enablement and disablement of the channels. Referring to FIG. 1, the switching part 18 is disposed between the LED array 20 of the each channel and the PWM controller 121 to connect/disconnect the LED array 20 of the each channel and the PWM controller 121 to/from each other in response to control of the control logic 13. However, this illustration is just exemplary and the switching part 18 may disablement of the LED array of the each channel. In a case where there is an input by the user through the input terminal T11 or a wireless input by the user through the input terminals T12 and T13, the control logic 13 controls the switching part 18 to enable only the LED array of a desired channel of the user in response to the input of the user and disable the LED array of a undesired channel.

Moreover, the switching part 18 has an on/off duty controlled by the PWM controller 121 to ensure the current to flow through the LED array of the each channel constantly. That is, the switching part 18 may include a plurality of switches disposed on each of the terminals T5 to T7 having the LED array of the each channel connected thereto, respectively. These switches each selectively enable or disable the each channel and have an on/off duty controlled by the PWM controller 121 to ensure the current to flow through the LED array of the each channel constantly with a predetermined magnitude.

Meanwhile, with regard to reference numerals of FIG. 1, reference numeral 161 denotes a low dropout regulator (LDO), 162 denotes a reference voltage generator supplying the reference voltage necessary for each element, and reference numeral 17 denotes a clock generator supplying a basic clock used in the PWM controller 121.

As described above, the LED driving device 10 of the present embodiment integrates the elements necessary for driving the LED arrays, such as the DC/DC converting part 11, the constant current controlling part 12 and the control logic 13 into a chip. Thus, the LED driving device 10 of the present embodiment can be downscaled and reduced in manufacturing costs and defect ratio over a circuit formed of individual lumped devices. Moreover, the LED driving device 10 of the present embodiment includes the control logic 13 and the wireless communication protocol part 14 to control the LED arrays to be driven in response to a wire and wireless signal inputted by the user from the outside.

As set forth above, according to exemplary embodiments of the invention, an LED driving device integrates all elements necessary for driving LEDs such as a DC/DC converting part, a constant current controlling part and a control logic into one chip. This allows a smaller size of the device and less manufacturing costs and defect ratio compared to a circuit configured using individual devices and chips.

In addition, a wireless control signal is inputted by a user from the outside through a control logic and a wireless communication protocol to control driving of the LEDs.

While the present invention has been shown and described in connection with the exemplary embodiments, it will be apparent to those skilled in the art that modifications and variations can be made without departing from the spirit and scope of the invention as defined by the appended claims.

What is claimed is:

1. A light emitting diode driving device for driving a plurality of light emitting diode arrays each including a plurality of light emitting diodes connected in series to one another, the light emitting diode driving device comprising:
a direct current/direct current converting part converting and outputting a direct current voltage inputted from the outside by switching of a switch into a driving voltage of a magnitude suitable for driving the plurality of light emitting diode arrays;
a switching part comprising a plurality of switches each connected to one end of each of the light emitting diode arrays to switch on/off a current flowing through the each of the light emitting diode arrays;
a constant current controlling part receiving at least one of information on the current flowing through the light emitting diode array and information on a voltage applied to the light emitting diode array by feed-back, the constant current controlling part comprising a pulse width modulation controller controlling a switching duty of the switch of the direct current/direct current converting part and controlling a switching duty of each of the switches of the switching part to allow the current to flow through the light emitting diode array with a predetermined magnitude; and
a control logic receiving a control signal by a user and controlling the pulse width modulation controller in response to the control signal;
wherein the direct current/direct current converting part comprises a multi-channel direct current/direct current converting part for driving the plurality of light emitting diode arrays individually through multiple channels, and
the pulse width modulation controller controls a corresponding one of the LED arrays belonging to each of the channels individually.

2. The light emitting diode driving device of claim 1, wherein the constant current controlling part further comprises a protective circuit receiving the at least one of the information on the current flowing through the light emitting diode array and the information on the voltage applied to the light emitting diode array and controlling the pulse width modulation controller to block the voltage or current applied to the light emitting diode array, when an overcurrent flows through the light emitting diode array or an overvoltage is applied to the light emitting diode array.

3. The light emitting diode driving device of claim 1, further comprising a wireless communication protocol part receiving the control signal wirelessly,
wherein the wireless communication protocol part has wireless communication controlled by a control logic.

4. The light emitting diode driving device of claim 1, further comprising a pulse width modulation phase converting part controlling the pulse width modulation controller to generate phase difference when controlling the LED array of the each channel.

5. The light emitting diode driving device of claim 1, wherein the control logic controls the pulse width modulation controller to determine one of enablement and disablement of at least portions of the light emitting diode arrays.

6. A light emitting diode driving device for driving a plurality of light emitting diode arrays each including a plurality of light emitting diodes connected in series to one another, the light emitting diode driving device comprising:
a direct current/direct current converting part converting and outputting a direct current voltage inputted from the outside by switching of a switch into a driving voltage of a magnitude suitable for driving the plurality of light emitting diode arrays;
a switching part comprising a plurality of switches each connected to one end of each of the light emitting diode arrays to switch on/off a current flowing through the each of the light emitting diode arrays;
a constant current controlling part receiving at least one of information on the current flowing through the light emitting diode array and information on a voltage applied to the light emitting diode array by feed-back, the constant current controlling part comprising a pulse width modulation controller controlling a switching duty of the switch of the direct current/direct current converting part and controlling a switching duty of each of the switches of the switching part to allow the current to flow through the light emitting diode array with a predetermined magnitude;
a control logic receiving a control signal by a user and controlling the pulse width modulation controller in response to the control signal; and
a wireless communication protocol part receiving control signal wirelessly, wherein the wireless communication protocol part has wireless communication controlled by a control logic.

* * * * *